US010291445B2

United States Patent
Agiwal et al.

(10) Patent No.: US 10,291,445 B2
(45) Date of Patent: May 14, 2019

(54) METHOD AND SYSTEM FOR MINIMIZING CHANNEL PRESERVATION TIME IN CELLULAR COMMUNICATIONS ON UN-LICENSED BAND

(71) Applicant: Samsung Electronics Co., Ltd, Gyeonggi-do (KR)

(72) Inventors: Anil Agiwal, Bangalore (IN); Anshuman Nigam, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 15/520,394

(22) PCT Filed: Oct. 21, 2015

(86) PCT No.: PCT/KR2015/011161
§ 371 (c)(1),
(2) Date: Apr. 19, 2017

(87) PCT Pub. No.: WO2016/064197
PCT Pub. Date: Apr. 28, 2016

(65) Prior Publication Data
US 2017/0317863 A1    Nov. 2, 2017

(30) Foreign Application Priority Data

Oct. 21, 2014   (IN) .......................... 5259/CHE/2014
Oct. 16, 2015   (IN) .......................... 5259/CHE/2014

(51) Int. Cl.
*H04L 27/00* (2006.01)
*H04L 5/00* (2006.01)
*H04L 27/26* (2006.01)

(52) U.S. Cl.
CPC ........ *H04L 27/0006* (2013.01); *H04L 5/0091* (2013.01); *H04L 27/2602* (2013.01);
(Continued)

(58) Field of Classification Search
CPC ............. H04L 27/0006; H04L 27/2605; H04L 27/2602; H04L 27/2613; H04L 5/0091; H04L 5/0007
See application file for complete search history.

(56) References Cited

U.S. PATENT DOCUMENTS

2013/0315152 A1    11/2013  Ratasuk et al.
2014/0031054 A1     1/2014  Zou et al.
(Continued)

FOREIGN PATENT DOCUMENTS

WO       2012169756 A2    12/2012

OTHER PUBLICATIONS

International Search Report dated Mar. 25, 2016 in connection with International Application No. PCT/KR2015/011161, 3 pages.
(Continued)

*Primary Examiner* — Afshawn M Towfighi

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Method and system for minimizing channel preservation time in a cellular communication network. The system, after channel sensing and if the channel is free, dynamically determines a Preservation Signal (PS) value, and then adjusts the channel preservation time, based on the determined PS value. The system can minimize the channel
(Continued)

preservation time, by restarting data transmission upon detecting a symbol boundary, while the data transmission is in progress.

18 Claims, 6 Drawing Sheets

(52) U.S. Cl.
CPC ...... *H04L 27/2605* (2013.01); *H04L 27/2613* (2013.01); *H04L 5/0007* (2013.01)

(56) References Cited

U.S. PATENT DOCUMENTS

2014/0112289 A1* 4/2014 Kim .................... H04W 16/14
370/329
2014/0162567 A1 6/2014 Hellfajer et al.

OTHER PUBLICATIONS

Written Opinion of the International Searching Authority dated Mar. 25, 2016 in connection with International Application No. PCT/KR2015/011161, 7 pages.

* cited by examiner

[Fig. 1]
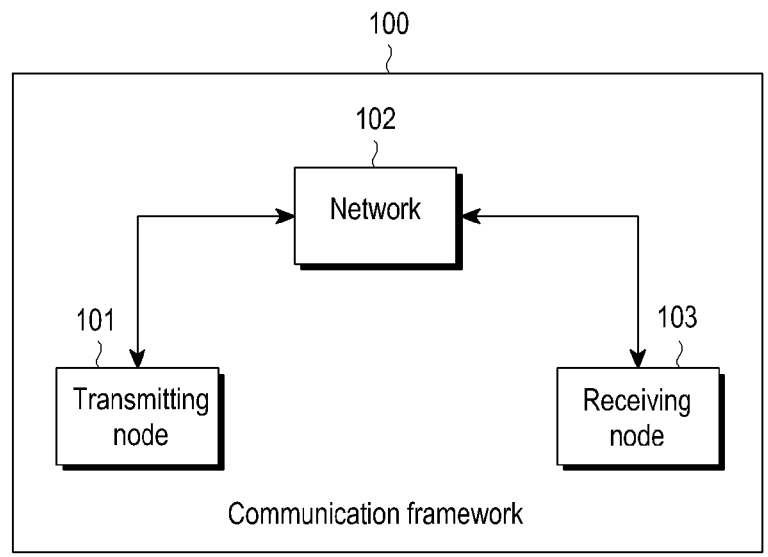
[Fig. 2]
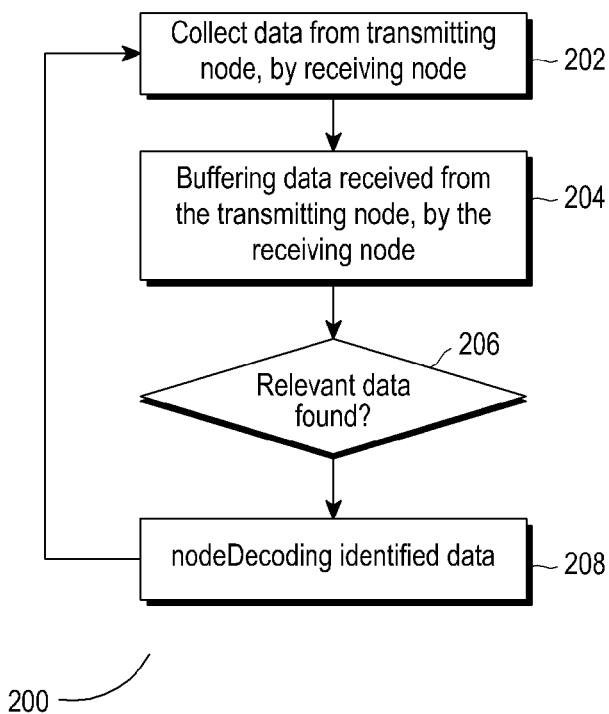

[Fig. 3]
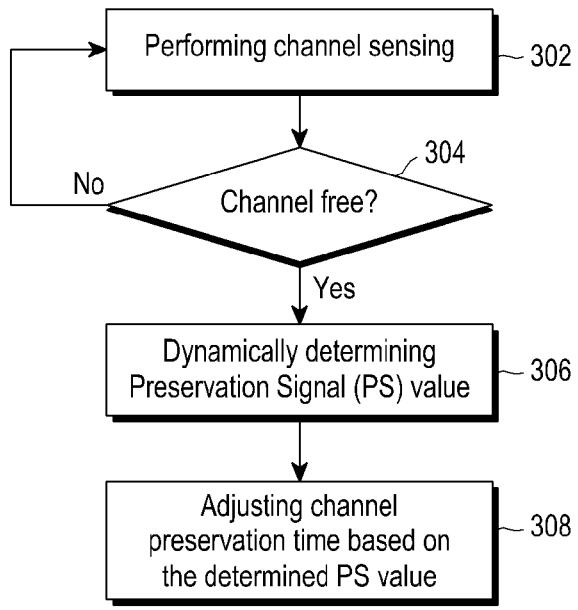
[Fig. 4]
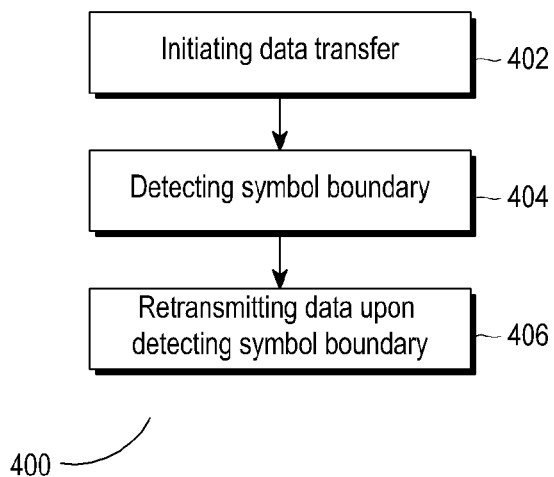

[Fig. 5a]
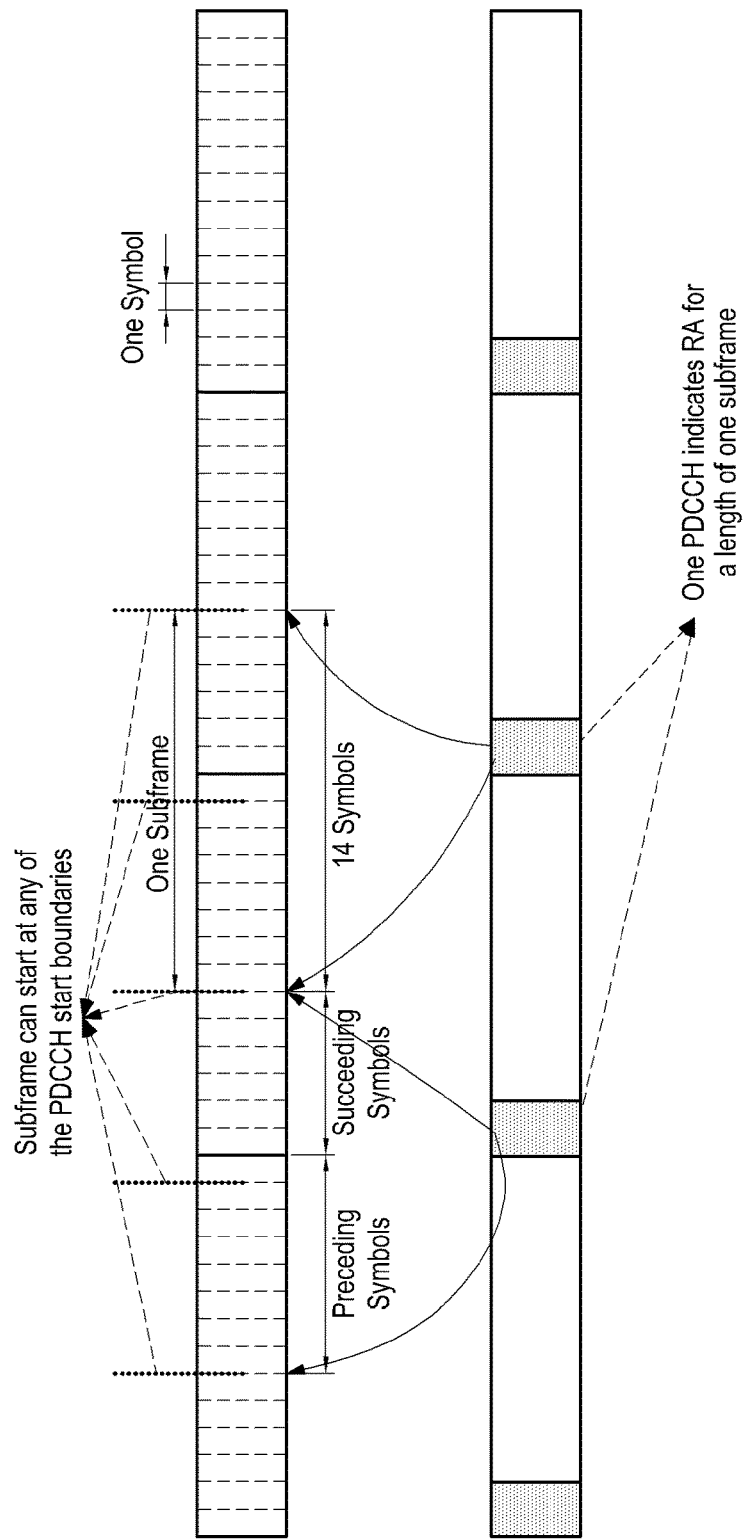

[Fig. 5b]
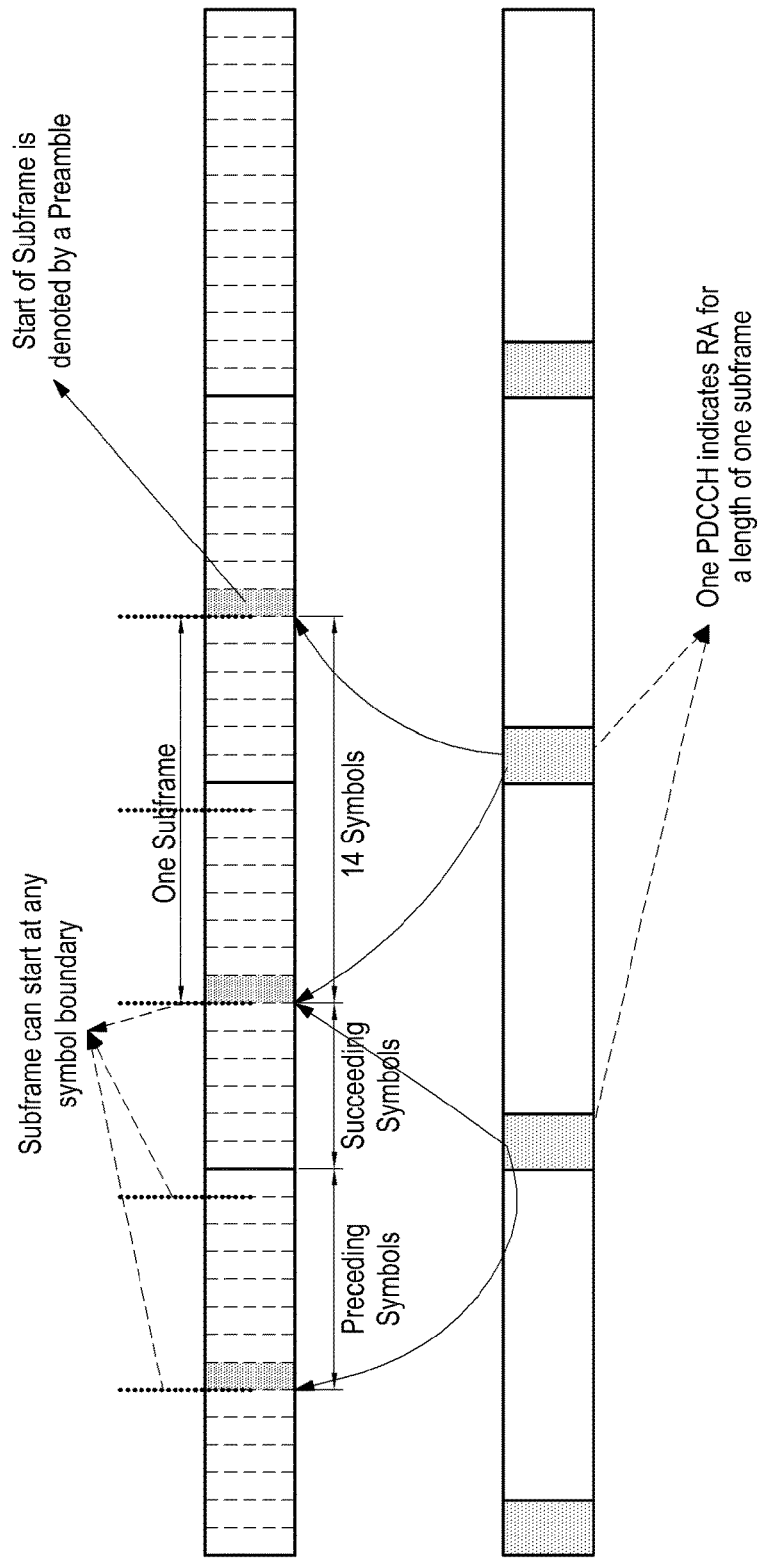

[Fig. 6]
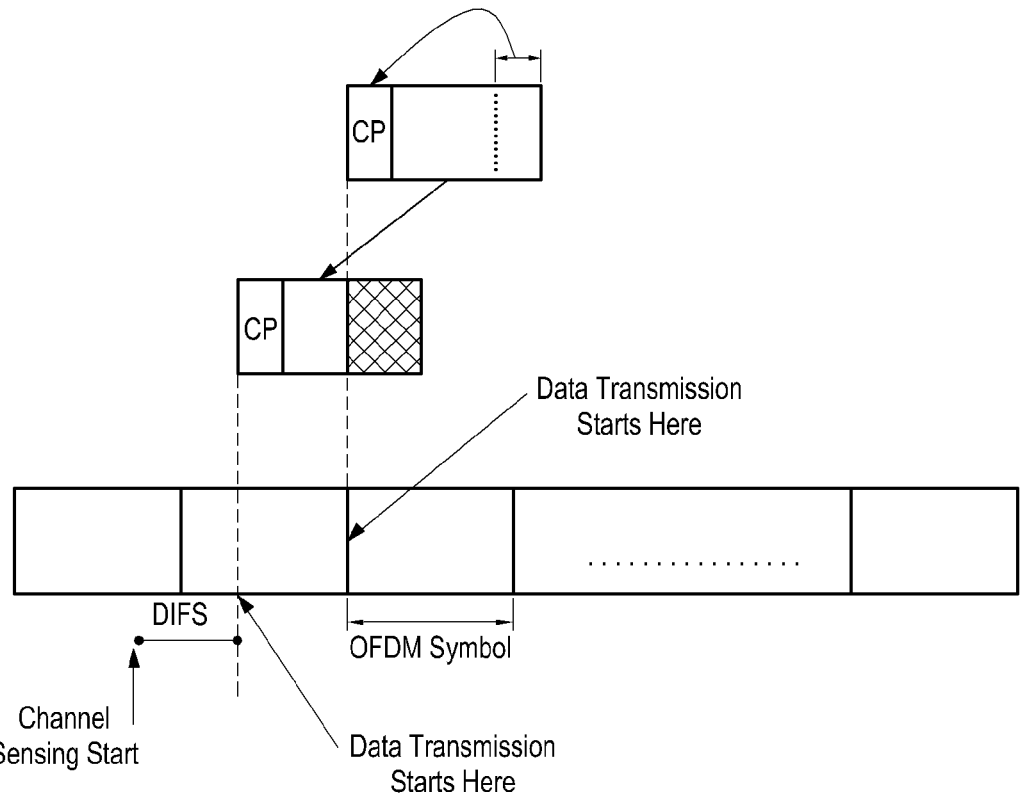
[Fig. 7a]
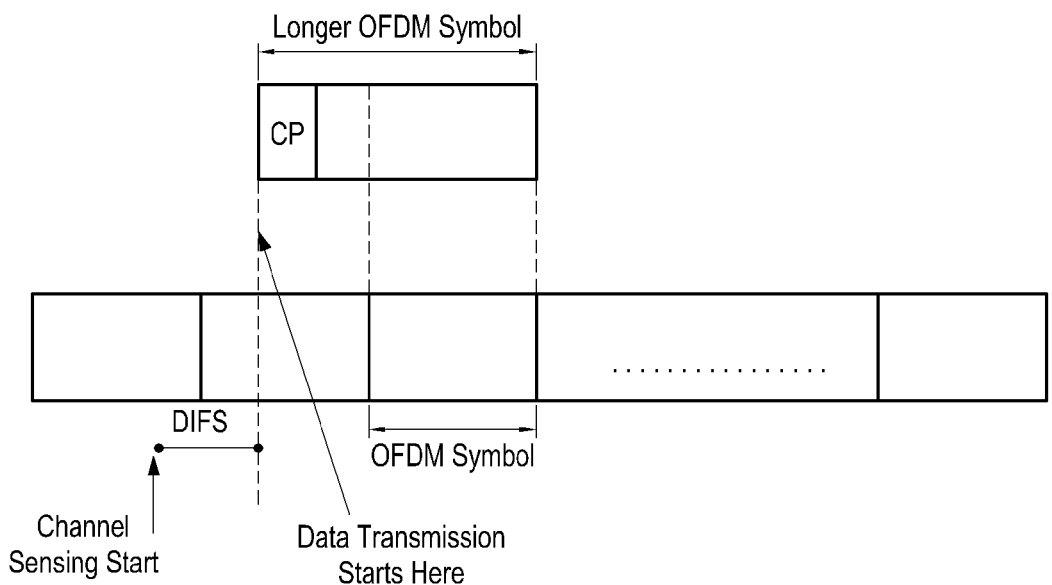

[Fig. 7b]
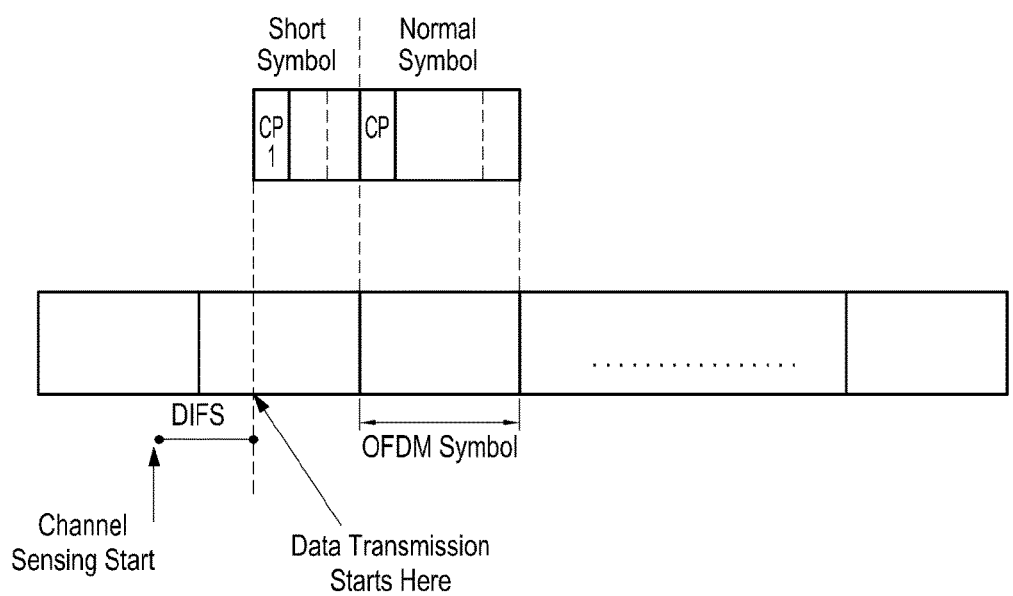

METHOD AND SYSTEM FOR MINIMIZING CHANNEL PRESERVATION TIME IN CELLULAR COMMUNICATIONS ON UN-LICENSED BAND

CROSS-REFERENCE TO RELATED APPLICATION(S)

The present application claims priority under 35 U.S.C. § 365 to International Patent Application No. PCT/KR2015/011161 filed Oct. 21, 2015, entitled "METHOD AND SYSTEM FOR MINIMIZING CHANNEL PRESERVATION TIME IN CELLULAR COMMUNICATIONS ON UN-LICENSED BAND", and, through International Patent Application No. PCT/KR2015/011161, to Indian Patent Application No. 5259/CHE/2014, filed on Oct. 21, 2014, and Indian patent application No. 5259/CHE/2014, filed on Oct. 16, 2015, each of which are incorporated herein by reference into the present disclosure as if fully set forth herein.

TECHNICAL FIELD

The embodiments herein relate to cellular communication and, more particularly, to minimize channel preservation time in cellular communication.

BACKGROUND ART

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The cellular industry which has been predominantly operating over licensed spectrum is considering the usage of operation on unlicensed band in order to meet the surging traffic demands. The unlicensed bands are typically dominated by Wi-Fi and other technologies. An unlicensed band is free to be used by any technology but is governed by few regulations (in most countries) like the requirement of "Listen Before Talk—LBT" which requires a transmitter to sense the channel for at least 20 us, and if the channel is found to be free i.e. not used by other devices, then the device is allowed to transmit. Further, the regulations allow for transmissions up to a maximum time limit and also provide means for giving fairness to the other devices/technologies.

In the legacy 3GPP Long Term Evolution (3GPP LTE) system, a concept of carrier aggregation is used in which multiple carriers can be allocated to a multi-carrier capable User Equipment (UE), in order to boost the data rates. In this technique, one carrier is referred to as the Primary carrier and the other carriers are referred to as the secondary carriers. Subframe boundaries on all the carriers are considered to be aligned. Further, scheduling can be self-carrier based or cross carrier based. In the self-carrier mode, the Physical Downlink Control Channel (PDCCH) for a secondary carrier is sent on the secondary carrier itself, whereas in the cross carrier mode, the resource allocation for all the secondary carriers is contained in the PDCCH that is sent on the primary carrier only.

However, when the unlicensed carrier is used as a secondary carrier, the frame structure of the LTE should be largely re-used. This results in a channel retention issue, as the channel is to be retained till the upcoming subframe boundary. Since the channel sensing for the unlicensed carrier can be done at any time, if the channel is found to be available for use, then the channel needs to be retained until the start of the symbol boundary. Otherwise, other users of the unlicensed band (like Wi-Fi nodes) can usurp the channel. It is to be noted that if channel sensing is performed just before the start of the subframe boundary (for a duration as required by regulations), it drastically impacts the channel availability probability, as non LTE-U users of the channel (like Wi-Fi) do not work on fixed frame structures, and can sense and start transmission at any time.

During the channel retention duration, active communication with the intended receiver(s) is not possible as the PDCCH can only be sent at the start of the subframe in the legacy system. Hence there is a need to minimize the channel retention period in order to increase the unlicensed channel usage.

DISCLOSURE OF INVENTION

Technical Problem

An object of the embodiments herein is to minimize channel retention time in a cellular communication system.

Solution to Problem

In view of the foregoing, an embodiment herein provides a method for managing channel preservation time in a communication system. Initially, a Preservation Signal (PS) duration is determined for a channel selected for communication, by a transmitting node of the communication system. Further, the channel preservation time is adjusted based on the determined PS duration, and the transmitting node initiates communication with at least one receiving node, based on the adjusted channel preservation time.

Embodiments further disclose a method for resource allocation signalling in a communication system. At least one resource is scheduled for a receiving node of the communication system, by a transmitting node of the communication system. Further, information pertaining to the scheduling of the resource is encoded in a Resource Allocation Signalling (RAS), by the transmitting node, wherein the RAS indicates resources on at least one of preceding symbols and succeeding symbols. The transmitting node transmits the RAS to the receiving node.

Embodiments further disclose a method for managing channel preservation time in a communication system. A transmitting node of the communication system detects a symbol boundary while transmitting data to a receiving node, and restarts data transmission upon detecting the symbol boundary.

Embodiments further disclose a system for managing channel preservation time in a communication system. A transmitting node of the communication determines Preservation Signal (PS) duration for a channel selected for communication, adjusts the channel preservation time based on the determined PS duration, and initiates communication with at least one receiving node, based on the adjusted channel preservation time, by the transmitting node.

Embodiments further disclose a system for resource allocation in a communication system. A transmitting node of the communication system schedules at least one resource for a receiving node of the communication system. The transmitting node encodes information pertaining to the scheduling of the resource in a Resource Allocation Signalling (RAS), wherein the RAS indicates resources on at least one of preceding symbols and succeeding symbols. The transmitting node further transmits the RAS to the receiving node.

Embodiments further disclose a system for managing channel preservation time in a communication system. A transmitting node of the communication system detects a symbol boundary while transmitting data to a receiving node, and restarts data transmission upon detecting the symbol boundary.

These and other aspects of the embodiments herein will be better appreciated and understood when considered in conjunction with the following description and the accompanying drawings.

BRIEF DESCRIPTION OF DRAWINGS

The embodiments herein will be better understood from the following detailed description with reference to the drawings, in which:

FIG. 1 illustrates a block diagram of the communication framework, as disclosed in the embodiments herein;

FIG. 2 is a flow diagram that depicts steps involved in the process of managing channel retention time by transmitting data at random symbols, as disclosed in the embodiments herein;

FIG. 3 is a flow diagram that depicts steps involved in the process of managing channel retention time by dynamically varying symbol length, as disclosed in the embodiments herein;

FIG. 4 is a flow diagram that depicts steps involved in the process of managing channel retention time by retransmitting data at symbol boundaries, as disclosed in the embodiments herein;

FIGS. 5a and 5b illustrate transmitting data based on dynamically varying symbol length, as disclosed in the embodiments herein;

FIG. 6 illustrates channel retention by retransmitting data at symbol boundaries, as disclosed in the embodiments herein; and FIGS. 7a and 7b illustrate transmitting data based on dynamically varying symbol length, as disclosed in the embodiments herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a mechanism for managing channel preservation time in a cellular communication network. Referring now to the drawings, and more particularly to FIGS. 1 through 7, where similar reference characters denote corresponding features consistently throughout the figures, there are shown embodiments.

FIG. 1 illustrates a block diagram of the communication framework, as disclosed in the embodiments herein. The communication framework 100 comprises of at least one transmitting node 101, and at least one receiving node 103, connected via a network 102.

The transmitting node 101 and the receiving node 103 can be any communication device that can support communication over licensed as well as unlicensed channels. An example is Mobile phone that supports cellular connectivity as well as a Wi-Fi connection. The transmitting node 101 can be configured to perform channel sensing before initiating transmission of data. The transmitting node 101 can be further configured to adjust channel preservation time, so as to prevent other nodes in the communication framework 100 from usurping the channel during an interval between 1) end of channel sensing and start of next symbol; and/or 2) two consecutive data transmissions. In an embodiment, the transmitting node 101 adjusts the channel preservation time, based on dynamically determined Preservation Signal (PS) value. In another embodiment, the transmitting node 101 adjusts the channel preservation time by restarting data transmission upon detecting symbol boundary, while the data transmission is active. In another embodiment, the transmitting node 101 adjusts/reduces the channel preservation time by transmitting data at any pre-defined symbol. While transmitting the data at any The receiving node 103 can be configured to collect information pertaining to the channel preservation time adjustments made by the transmitting node 101. The receiving node 103 can be further configured to synchronize data reception, according to the channel preservation time management technique being used by the transmitting node 101, such that the data received from the transmitting node 101 can be decoded.

FIG. 2 is a flow diagram that depicts steps involved in the process of managing channel preservation time by transmitting data at random symbols, as disclosed in the embodiments herein. In this process, the transmitting node 101 starts data transfer at random symbols, encodes resource allocation details in a Resource Allocation Signalling (RAS), and sends the RAS to the receiving node 103. In an embodiment, the RAS is a Physical Downlink Control Channel (PDCCH) message. In various embodiments, the RAS indicates resources on preceding symbols as well as succeeding symbols, with reference to a start symbol; wherein the start symbol also is sent along with the RAS. Further, capability to initiate data transfer at random symbols helps to reduce the channel preservation time.

The receiving node collects (202) the data from the receiving node. The receiving node 103 further buffers (204) the collected data, and while buffering, reads the PDCCH messages that are part of the data being buffered. By reading the PDCCH messages, the receiving node 103 identifies whether any relevant data is present or not, among the data collected from the transmitting node. If relevant data is found to be present, then, based on the resource allocation information being conveyed by the PDCCH message, the receiving node decodes (208) the data. In this method, as the sub frame can start at any symbol boundary, the start of the sub frame is indicated using a suitable preamble (as depicted in FIGS. 5*a* and 5*b*), information of which is conveyed to the receiving node 103, for synchronization purpose. The various actions in method 200 may be performed in the order presented, in a different order or simultaneously. Further, in some embodiments, some actions listed in FIG. 2 may be omitted.

FIG. 3 is a flow diagram that depicts steps involved in the process of managing channel preservation time by dynamically varying symbol length, as disclosed in the embodiments herein. In this method, the transmitting node 101 initially performs (302) a channel sensing, during which the transmitting node 101 tries to identify at least one channel that can be used for the data transmission purpose. The channel sensing can be continued until at least one channel that is suitable for communication has been found.

Upon identifying a channel, the transmitting node 101 dynamically determines a Preservation Signal (PS) value such that the channel preservation time is adjusted as per requirements. The PS can be a legacy reference signal, a new reference signal, an extended Cyclic Prefix (CP), and any such signal. Further, adjusting the channel preservation time can involve:

1. Retaining the Channel

Retention of the channel can be done by transmitting random signals during the interval between two successive symbols. The signal that is transmitted can be at least one of a legacy reference signal, a new reference signal, an extended Cyclic Prefix (CP), and any such signal. Further, if CP is used, different symbol lengths can be attributed/mapped to different CPs. For example, symbol length up to a first length (say xx) can be mapped to a first CP (CP1) and symbol length up to a second length (say xy) can be mapped to a second CP (CP2). In this case, the selected signal is used as a preamble to fill gap till next boundary i.e. till next symbol. The type of signal being used to fill the gap is pre-defined or randomly selected. Further, the receiving node 103 is notified about the type of signal selected, so that the data reception and decryption can be accordingly synchronized.

In another embodiment, the channel can be retained by starting data transmission right after DIFS and by retransmitting at the symbol boundary (as depicted in FIG. 4). In this process, after initiating (402) the data transfer to at least one receiving node 103, the transmitting node 101 checks for symbol boundaries. Further, upon detecting (404) the symbol boundary, the data transmission is restarted (406) at the symbol boundary. This is further depicted in FIG. 6.

2. Not Retaining the Channel

The data transmission without retaining the channel can involve dynamically varying symbol length. In various embodiments, dynamically varying the symbol length can involve increasing length of the symbol or decreasing length of the symbol. The symbol length is measured as the difference between time of end of channel sensing and time of start of next symbol. If the difference is less than that of a normal symbol, then a short symbol can be used to fill the gap (as depicted in FIG. 7*b*). If the difference is greater than that of a normal symbol, then a longer symbol can be used to fill the gap (as depicted in FIG. 7*a*). In another embodiment, the long and short symbols are pre-prepared and stored with the network 102 such that the required symbol can be selected and used as and when required.

The embodiments disclosed herein can be implemented through at least one software program running on at least one hardware device and performing network management functions to control the network elements. The network elements shown in FIG. 2 include blocks which can be at least one of a hardware device, or a combination of hardware device and software module.

The embodiments disclosed herein specify a mechanism for managing channel preservation time in a cellular communication system. The mechanism allows dynamic change of symbol length, providing a system thereof. Therefore, it is understood that the scope of protection is extended to such a system and by extension, to a computer readable means having a message therein, said computer readable means containing a program code for implementation of one or more steps of the method, when the program runs on a server or mobile device or any suitable programmable device. The method is implemented in a preferred embodiment using the system together with a software program written in, for ex. Very high speed integrated circuit Hardware Description Language (VHDL), another programming language, or implemented by one or more VHDL or several software modules being executed on at least one hardware device. The hardware device can be any kind of device which can be programmed including, for ex. any kind of a computer like a server or a personal computer, or the like, or any combination thereof, for ex. one processor and two FPGAs. The device may also include means which could be for ex.

hardware means like an ASIC or a combination of hardware and software means, an ASIC and an FPGA, or at least one microprocessor and at least one memory with software modules located therein. Thus, the means are at least one hardware means or at least one hardware-cum-software means. The method embodiments described herein could be implemented in pure hardware or partly in hardware and partly in software. Alternatively, the embodiment may be implemented on different hardware devices, for ex. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

The invention claimed is:

1. A method for managing channel preservation time in a communication system, the method comprising:
   selecting, by a transmitting node, a channel to be available for communication on an unlicensed band based on channel sensing on the unlicensed band;
   determining, by the transmitting node, a preservation signal (PS) duration in which a preservation signal is to be transmitted on the selected channel;
   adjusting, by the transmitting node, the channel preservation time in which the unlicensed band is allowed to the transmitted node based on the determined PS duration; and
   initiating communication with at least one receiving node on the unlicensed band based on the adjusted channel preservation time,
   wherein the PS duration is determined as a difference between a time of end of the channel sensing and a time of start of a next symbol after the channel sensing.

2. The method as claimed in claim 1, wherein the preservation signal is at least one of a cyclic prefix (CP), an extended CP, or a legacy reference signal.

3. The method as claimed in claim 2, wherein a length of the extended CP is selected from a set of pre-specified CP lengths.

4. The method as claimed in claim 1, wherein adjusting the channel preservation time comprises varying a symbol length for the selected channel to a pre-prepared shorter symbol length, based on the determined PS duration.

5. The method as claimed in claim 4, wherein information pertaining to the shorter symbol length is communicated to the at least one receiving node.

6. The method as claimed in claim 1, wherein adjusting the channel preservation time comprises varying a symbol length for the selected channel to a pre-prepared longer symbol length, based on the determined PS duration.

7. The method as claimed in claim 6, wherein information pertaining to the longer symbol length is communicated to the at least one receiving node.

8. A method for resource allocation signaling in a communication system, the method comprising:

scheduling, by a transmitting node, at least one resource on an unlicensed band;
   encoding information pertaining to the scheduling of the at least one resource in a resource allocation signaling (RAS), by the transmitting node, wherein the RAS indicates at least one of preceding symbols or succeeding symbols with reference to a starting position of the at least one scheduled resource; and
   transmitting the RAS to a receiving node, by the transmitting node.

9. The method as claimed in claim 8, wherein the RAS indicates a starting symbol for the resource allocation.

10. An apparatus for managing channel preservation time in a communication system, the apparatus comprising:
   a controller configured to:
      select a channel to be available for communication on an unlicensed band based on channel sensing on the unlicensed band;
      determine a preservation signal (PS) duration in which a preservation signal is to be transmitted on the selected channel,
      adjust the channel preservation time in which the unlicensed band is allowed to the transmitted node based on the determined PS duration, and
      initiate communication with at least one receiving node on the unlicensed band, based on the adjusted channel preservation time; and
   a transceiver configured to communicate with the at least one receiving node on the unlicensed band,
   wherein the PS duration is determined as a difference between a time of end of the channel sensing and a time of start of a next symbol after the channel sensing.

11. The apparatus as claimed in claim 10, wherein the controller is configured to select at least one of a cyclic Prefix (CP), an extended CP, or a legacy reference signal, as the preservation signal.

12. The apparatus as claimed in claim 11, wherein the controller is configured to select a length of the extended CP from a set of pre-specified CP lengths.

13. The apparatus as claimed in claim 10, wherein the controller is configured to adjust the channel preservation time by varying a symbol length for the selected channel to a pre-prepared shorter symbol length, based on the determined PS duration.

14. The apparatus as claimed in claim 13, wherein the controller is configured to communicate information pertaining to the shorter symbol length to the at least one receiving node.

15. The apparatus as claimed in claim 10, wherein the controller is configured to adjust the channel preservation time by varying a symbol length for the selected channel to a pre-prepared longer symbol length, based on the determined PS duration.

16. The apparatus as claimed in claim 15, wherein the transceiver is configured to communicate information pertaining to the longer symbol length to the at least one receiving node.

17. An apparatus for resource allocation signaling in a communication system, the apparatus comprising:
   a controller configured to:
      schedule at least one resource on an unlicensed band, and
      encode information pertaining to the scheduling of the at least one resource in a resource allocation signaling (RAS), wherein the RAS indicates at least one of preceding symbols or succeeding symbols with reference to a starting position of the at least one scheduled resource; and a transceiver configured to transmit the RAS to a receiving node.

18. The apparatus as claimed in claim 17, wherein the controller is further configured to indicate, in the RAS, at least one starting symbol for the resource allocation.

* * * * *